United States Patent
Kim et al.

(10) Patent No.: US 11,920,404 B2
(45) Date of Patent: Mar. 5, 2024

(54) APPARATUS FOR MANUFACTURING VACUUM GLASS

(71) Applicant: LG ELECTRONICS INC., Seoul (KR)

(72) Inventors: Sora Kim, Seoul (KR); Soyoon Kim, Seoul (KR); Yunsung Kim, Seoul (KR); Eunsoo Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 729 days.

(21) Appl. No.: 16/982,819

(22) PCT Filed: Jan. 31, 2019

(86) PCT No.: PCT/KR2019/001398
§ 371 (c)(1),
(2) Date: Sep. 21, 2020

(87) PCT Pub. No.: WO2019/190043
PCT Pub. Date: Oct. 3, 2019

(65) Prior Publication Data
US 2021/0054684 A1    Feb. 25, 2021

(30) Foreign Application Priority Data

Mar. 26, 2018  (KR) .......................... 10-2018-0034483

(51) Int. Cl.
*E06B 3/677*    (2006.01)
*C03C 8/02*    (2006.01)
*C03C 8/20*    (2006.01)

(52) U.S. Cl.
CPC .............. *E06B 3/6775* (2013.01); *C03C 8/02* (2013.01); *C03C 8/20* (2013.01); *C03C 2204/00* (2013.01)

(58) Field of Classification Search
CPC .................................................. E06B 3/6775
See application file for complete search history.

(56) References Cited

U.S. PATENT DOCUMENTS 4,125,390 A * 11/1978 Kawai ................... B29C 67/004
65/59.22
6,506,272 B1  1/2003 Aggas
(Continued)

FOREIGN PATENT DOCUMENTS

EP       1439152 A1    7/2004
JP    2000208051 A     7/2000
(Continued)

OTHER PUBLICATIONS

Database WPI, Week 201781, Thomson Scientific, London, GB; An 2017-82026J, XP002804802.
(Continued)

*Primary Examiner* — Philip C Tucker
*Assistant Examiner* — John Blades
(74) *Attorney, Agent, or Firm* — Bryan Cave Leighton Paisner LLP

(57) ABSTRACT

An apparatus for manufacturing vacuum insulation glass is provided. The apparatus for manufacturing the vacuum insulation glass includes a cap frit disposed on an exhaust hole, and an exhaust finishing frit provided on a bottom surface of the cap frit and including a frit formed of a glass material. The exhaust finishing frit is dispensed, in the paste form, to the cap frit such that the exhaust finishing frit is easily aligned with the cap frit.

16 Claims, 13 Drawing Sheets

(56) References Cited

U.S. PATENT DOCUMENTS

| | | |
|---|---|---|
| 2004/0253395 A1 | 12/2004 | Amari et al. |
| 2014/0252386 A1 | 9/2014 | Ito et al. |
| 2016/0297706 A1 | 10/2016 | Naito et al. |
| 2017/0129798 A1 | 5/2017 | Steinwandel et al. |
| 2019/0203523 A1 | 7/2019 | Park |

FOREIGN PATENT DOCUMENTS

| | | |
|---|---|---|
| JP | 200467406 A | 3/2004 |
| JP | 2011-003397 A1 | 1/2011 |
| JP | 2014-197535 A | 10/2014 |
| KR | 1020040053198 A | 6/2004 |
| KR | 1020140092129 A | 7/2014 |
| KR | 10-2014-0120140 A | 10/2014 |
| KR | 10-2017-0127771 A | 11/2017 |
| KR | 1020180005462 A | 1/2018 |
| KR | 10-2018-0011970 A | 2/2018 |
| WO | 0175260 A1 | 10/2001 |
| WO | 2010114285 A2 | 10/2010 |
| WO | 2015087718 A1 | 6/2015 |
| WO | 2018008958 A1 | 1/2018 |

OTHER PUBLICATIONS

Database WPI, Week 201806, Thomson Scientific, London, GB; An 2018-02945G, XP002804803.

* cited by examiner

APPARATUS FOR MANUFACTURING VACUUM GLASS

CROSS-REFERENCE TO RELATED APPLICATIONS

This application is the National Phase of PCT International Application No. PCT/KR2019/001398, filed on Jan. 31, 2019, which claims priority to Korean Patent Application No. 10-2018-0034483 filed on Mar. 26, 2018 in Korea, the entire contents of which is hereby incorporated by reference in its entirety.

BACKGROUND

The present disclosure relates to an apparatus for manufacturing vacuum insulation glass.

Glass may be used for the door of a home appliance. For example, the glass may be used for the door of a refrigerator. If the glass is applied to the door of the refrigerator, a user has an advantage in that the user may easily see foods stored in the refrigerator through transparent glass without opening the door.

However, since the glass represents a lower insulating rate due to the intrinsic characteristic of the glass, chilly air stored in the refrigerator may leak to the outside through the glass. In particular, when the glass constitutes a glazing in a single layer, the lower insulating rate may be a more serious problem.

To compensate for the lower insulating rate, the glass may constitute a double glazing or a vacuum glazing including at least two glazings. The double glazing may be formed by injecting specific gas, which has a lower heat transfer coefficient, between the two glazings.

In addition, the vacuum glazing may be formed by making, in the vacuum state, the space between the two glazings. The vacuum glazing is more advantage than the double glazing in terms of an ability to block heat from being transferred to an inside or an outside of glass.

The vacuum insulation glass may be manufactured through an apparatus for manufacturing the vacuum insulation glass. For example, the apparatus for manufacturing the vacuum insulation glass may include a heating device to melt a sealing member to bond two glass plates to each other, a vacuum device to make vacuum between two glass plates, and a capping device to seal an exhaust hole formed in the two glass plates.

Regarding such an apparatus for manufacturing the vacuum insulation glass, there is introduced the following related art.
1. Korean Unexamined Patent Application No. (published date): 10-2015-0124068 (Nov. 5, 2015).
2. The title of the invention: Apparatus for manufacturing vacuum insulation glass panel.

The related art has following problems.

First: a vacuum chamber is provided to form a vacuum atmosphere, and vacuum insulation glass panel has to be introduced into the vacuum panel to perform a manufacturing process. Accordingly, the size of the vacuum chamber is excessively increased. Accordingly, as the volume of the manufacturing apparatus is increased, it is difficult to realize a compact manufacturing apparatus.

In addition, when the vacuum chamber, which is an essential component of the conventional manufacturing apparatus, is not applied, a vacuum leak may occur in the capping device for the vacuum insulation glass panel. Accordingly, it is not easy to realize the conventional manufacturing apparatus by removing the vacuum chamber.

Second, as there is present the difference between a temperature in an exhaust process of the vacuum insulation glass panel and a temperature in a finish process to seal the exhaust hole. Accordingly, when the exhaust process and the finish process are sequentially performed, the glass panel may be damaged due to the thermal impact resulting from the temperature difference.

Third, when the exhaust process is performed, stress may be intensively applied to a peripheral portion of the exhaust hole, thereby causing the damage to the glass panel.

SUMMARY

The present disclosure is suggested to solve such a problem, and is to provide an apparatus for manufacturing vacuum insulation glass capable of improving insulation performance.

In addition, the present disclosure is to provide an apparatus for manufacturing vacuum insulation glass in a compact structure. In particular, the present disclosure is to provide an apparatus for manufacturing vacuum insulation glass, capable of performing an exhaust process and a finish process under a vacuum atmosphere as an exhaust head including a heating device and a vacuum device is provided, In addition, the present disclosure is to provide an apparatus for manufacturing vacuum insulation glass, capable of preventing air bubbles from being generated in an exhaust finishing frit in a finish process by effectively transferring exhaust pressure the exhaust finishing frit through a cap frit.

Further, the present disclosure is to provide an apparatus for manufacturing vacuum insulation glass, capable of preventing a thermal impact from being applied to a plate glass assembly due to the difference in temperature between an exhaust process and a finish process by preventing thermal transfer between a heating device and the plate glass assembly as a support plate is provided on a cap frit.

In addition, the present disclosure is to provide an apparatus for manufacturing vacuum insulation glass, which includes a configuration allowing a support plate to easily press a cap frit.

In addition, the present disclosure is to provide an apparatus for manufacturing vacuum insulation glass, capable of easily exhausting gas from a plate glass assembly by improving the structure of an exhaust finishing frit.

According to an embodiment of the present disclosure, an apparatus for manufacturing vacuum insulation glass may include a cap frit disposed on the exhaust hole, and an exhaust finishing frit provided on a bottom surface of the cap frit and including a frit formed of a glass material. The exhaust finishing frit may be dispensed, in a paste form, to the cap frit such that the exhaust finishing frit is easily aligned with the cap frit.

The exhaust finishing frit may include an exhaust passage to guide the internal gas of the plate glass assembly such that the internal gas of the plate glass assembly is exhausted, so the exhaust process may be easily performed.

The exhaust finishing frit may have a rounded shape or a bent shape, and may have various shapes.

Since the exhaust finishing frit may have an open loop shape, the exhaust process of the plate glass assembly may be easily performed.

The exhaust finishing frit may have a cutoff part formed as the exhaust finishing frit is cut off in at least a portion thereof, and the exhaust passage may be defined by the cutoff part.

The exhaust finishing frit includes a first frit having a first cutoff part, and a second frit spaced apart from the first frit outward and having a second cutoff part.

The exhaust passage includes a first passage defined by the first cutoff part, and a second passage defined by the second cutoff part.

The apparatus further includes a support plate provided at a lower portion the exhaust head to press the cap frit, and the support plate includes a plate through part communicating with the exhaust passage.

The exhaust finishing frit may extend in a spiral shape, and a space between a portion and another portion of the exhaust finishing frit may define the exhaust passage.

The exhaust finishing frit may have a shape bent several times, and a space between a portion and another portion of the exhaust finishing frit may define the exhaust passage.

The exhaust finishing frit may have a cylindrical shape cut off in at least a portion of the exhaust finishing frit, and the cutoff part may define the exhaust passage.

The exhaust finishing frit may include a paste-type enamel composition, and the exhaust finishing frit may be dispensed in a predetermined shape to the cap frit.

According to the present disclosure, the vacuum insulation glass may be manufactured with the improved insulation performance through the technical solution.

Since the apparatus for manufacturing the vacuum insulation glass, which has the compact structure without the vacuum chamber for introducing the plate glass assembly, is realized, the manufacturing process of the vacuum insulation glass may be simple, and the manufacturing cost of the vacuum insulation glass may be reduced. In particular, the exhaust process and the finish process may be easily performed under the vacuum atmosphere by providing the exhaust head including the heating device and the vacuum device.

In addition, the cap frit may be easily aligned with the exhaust finishing frit by dispensing the exhaust finishing frit to the cap frit. In addition, when the exhaust process is performed, the exhaust pressure may be effectively transferred to the exhaust finishing frit through the cap frit.

In addition, as the exhaust finishing frit is provided such that the passage (hereinafter, the exhaust passage) to exhaust gas is formed, the gas may be easily exhausted from the inner part of the plate glass in the exhaust process.

In addition, the support plate is provided on the cap frit to prevent heat from being transferred to the space between the heating device and the plate glass assembly. Accordingly, the thermal impact may be prevented from being applied to the plate glass assembly due to the temperature difference in the exhaust process and the finish process.

In addition, the elastic member is supported on the support plate such that the support plate easily presses the cap frit. Accordingly, the stress applied to the peripheral portion of the exhaust hole may be distributed to the cap frit or the support plate, thereby preventing the damage to the plate glass assembly.

DETAILED DESCRIPTION OF THE EMBODIMENTS

Hereinafter, the detailed embodiment of the present disclosure will be described with reference to accompanying drawings. However, the spirit of the present disclosure is not limited to suggested embodiments, and those skilled in the art, which understands the spirit of the present disclosure, may easily suggest another embodiment within the same technical scope.

First Embodiment

Figure 1:
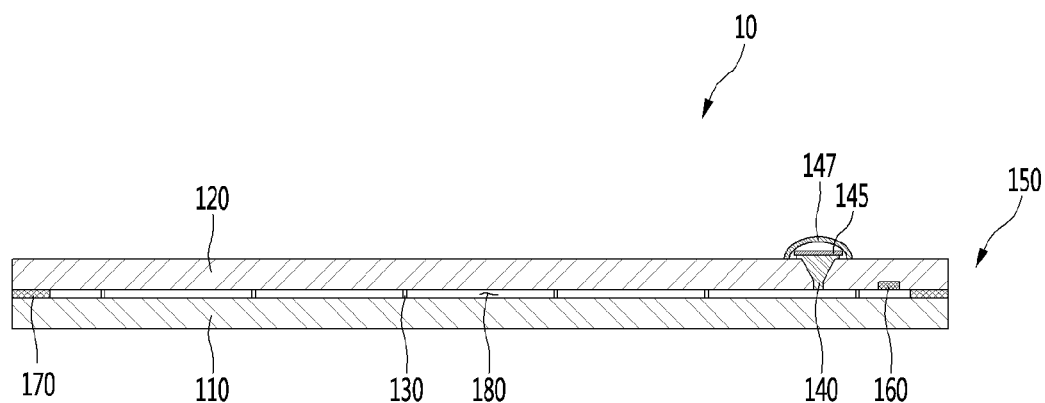
FIG. 1 is a sectional view illustrating the configuration of vacuum insulation glass according to an embodiment of the present disclosure.

FIG. 1 is a sectional view illustrating the configuration of vacuum insulation glass according to an embodiment of the present disclosure.

Referring to FIG. 1, according to an embodiment of the present disclosure, vacuum insulation glass 10 may be used for a door of a refrigerator.

The vacuum insulation glass 10 includes a plurality of plate glasses 110 and 120. The plurality of plate glasses 110 and 120 include the first plate glass 110 and the second plate glass 120 disposed at one side of the first plate glass 110. Although the direction, in which the first and second plate glasses 110 and 120 are arranged, may be varied depending on viewing directions, the second plate glass 120 may be disposed on the first plate glass 110 when viewed based on the drawings.

For example, when the vacuum insulation glass 10 is used for the door of the refrigerator, the second plate glass 120 may form the rear surface of the door of the refrigerator and the first plate glass 110 may form the front surface of the door of the refrigerator.

The first plate glass 110 and the second plate glass 120 may be provided in the form of a thin plate. For example, the thicknesses of the first and second plate glasses 110 and 120 may be formed in the range of 3.5 mm to 4.5 mm. For example, the first and second plate glasses 110 and 120 may have, for example, the shape of a rectangular panel. In addition, the first and second plate glasses 110 and 120 may be provided in equal size or in the same shape.

The first and second plate glasses 110 and 120 may be configured to be combined with each other. A sealant 170 may be interposed between the first and second plate glasses 110 and 120. In detail, the sealant 170 may be provided at the edge portions of the first and second plate glasses 110 and 120 to seal the space between the first and second plate glasses 110 and 120.

The sealant 170 may be applied to the first plate glass 110. For example, the sealant 170 may be sprayed on the first plate glass 110. In addition, the sealant 170 may include a glass frit. When a plate glass assembly (110 and 120 is formed and heated as the first and second plate glasses 110 and 120 are assembled with each other and then heated, the sealant 170 is melted to be compressed between the first and second plate glasses 110 and 120.

The first and second plate glasses 110 and 120 may be disposed to be spaced apart from each other in a vertical direction, and a vacuum layer 180 may be formed in the space between the first and second plate glasses 110 and 120. In other words, the vacuum layer 180 may be formed between the top surface of the first plate glass 110 and the bottom surface of the second plate glass 120. The vertical-directional width of the vacuum layer 180 may be formed to be in the range of about 0.18 mm to 0.22 mm, and the vacuum pressure may be $10^{-3}$ Torr or less.

A spacer 130 may be provided between the first and second plate glasses 110 and 120 to support the first and second plate glasses 110 and 120. The spacer 130 may be provided in the vacuum layer 180 and may have, for example, a substantially cylindrical shape.

A lower portion of the spacer 130 may be supported on the top surface of the first plate glass 110, and an upper portion of the spacer 130 may support the bottom surface of the second plate glass 120.

The spacer 130 includes a plurality of spacers 130. The diameter of the spacer 130 may be about 0.5 mm, and the spacing between the plurality of spacers 130 may be about 25 mm.

An exhaust finishing material 140 is provided on the second plate glass 120. The exhaust finishing material 140, which is a component to seal an exhaust hole 125 (see FIG. 2C) formed in the second plate glass 120, may be formed as an exhaust finishing frit 140*a* (see FIG. 3) is melted and cooled.

The exhaust hole 125 is a component to exhaust gas present between the first and second plate glasses 110 and 120 to form the vacuum layer 180 in the space between the first and second plate glasses 110 and 120. The exhaust hole 125 may be formed through the second plate glass 120 in the vertical direction. In other words, the exhaust hole 125 may be formed through the second plate glass 120 while extending from the top surface to the bottom surface of the second plate glass 120.

After the gas is exhausted through the exhaust hole 125, the exhaust finishing material 140 closes the exhaust hole 125. For example, the exhaust finishing material 140 may be formed of a glass frit including a glass material having a lower melting point.

An exhaust cap 145 is further provided on the second plate glass 120 such that the exhaust cap 145 is coupled to an upper portion of the exhaust finishing material 140. The exhaust cap 145, which is configured after completing the manufacturing process of a cap frit 145*a* (see FIG. 3) provided in the apparatus for manufacturing the vacuum insulation glass, may be understood as a component to press the exhaust finishing frit 140*a* when performing the exhaust process.

The vacuum insulation glass 10 further includes a finish cap 147 provided on the exhaust finishing material 140 and the exhaust cap 145. The exhaust cap 147 may have a cap shape to cover the exhaust finishing material 140 and the exhaust cap 145 and may include a metallic material. The finish cap 147 prevents the external pressure of the vacuum insulation glass 10 from being applied to the exhaust finishing material 140. Accordingly, the finish cap 147 may prevent the exhaust finishing material 140 from deviating from the exhaust hole 125 or prevent the damage to the exhaust finishing material 140.

The vacuum insulation glass 10 further includes a gas adsorbent 160 (getter). The gas adsorbent 160 may be understood as a configuration to absorb the moisture or gas that is able to be generated in the manufacturing process of the vacuum insulation glass 10.

In other words, even if the vacuum layer 180 is formed inside the vacuum insulation glass 10, moisture or specified gas may be generated in the first and second plate glasses 110 and 120 or the spacer 130. The gas adsorbent 160 absorbs the gas such that the vacuum state is maintained. For example, the gas adsorbent 160 may include non-evaporable getter activated when a current is applied. After the vacuum insulation glass 10 is completely manufactured, power supplied from the outside of the vacuum insulation glass 10 may be supplied to the gas adsorbent 160 through a wire.

Figure 2A:
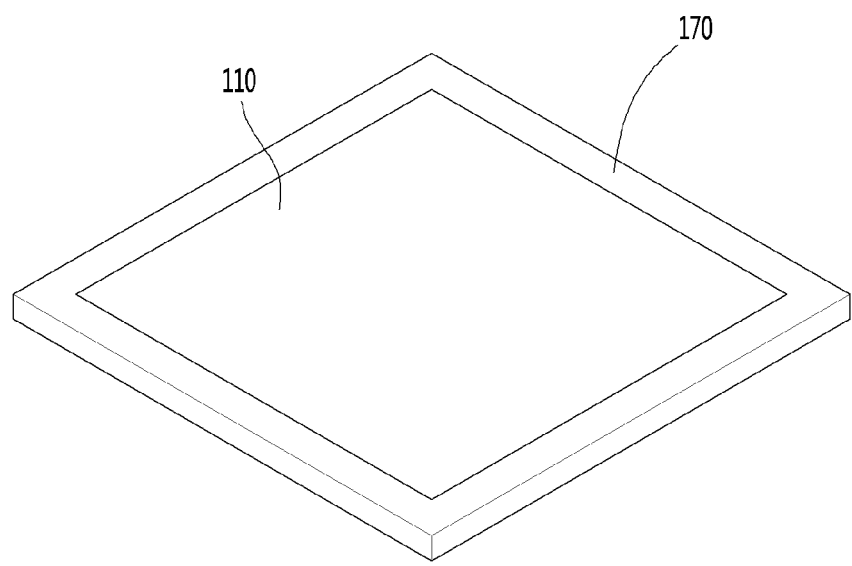
FIGS. 2A to 2C are views illustrating a manufacturing process of a plate glass assembly according to an embodiment of the present disclosure.
Figure 2B:
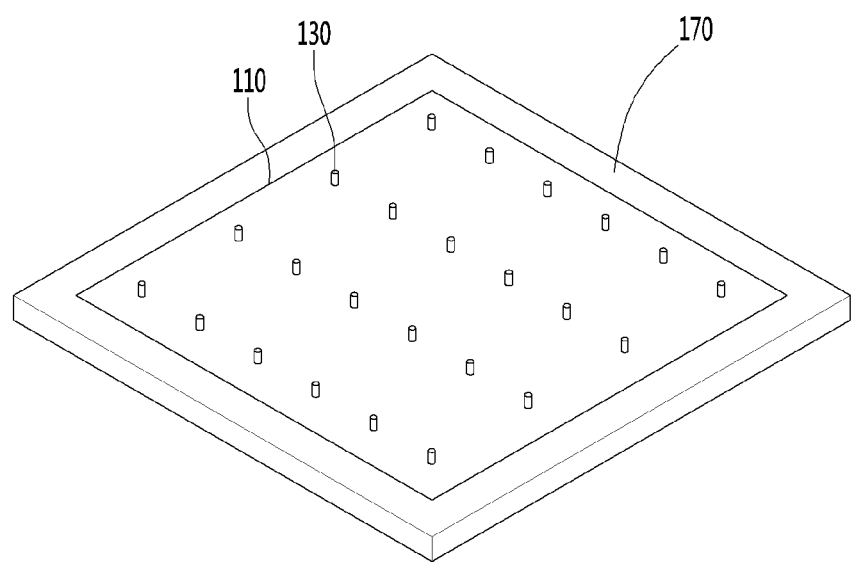
Figure 2C:
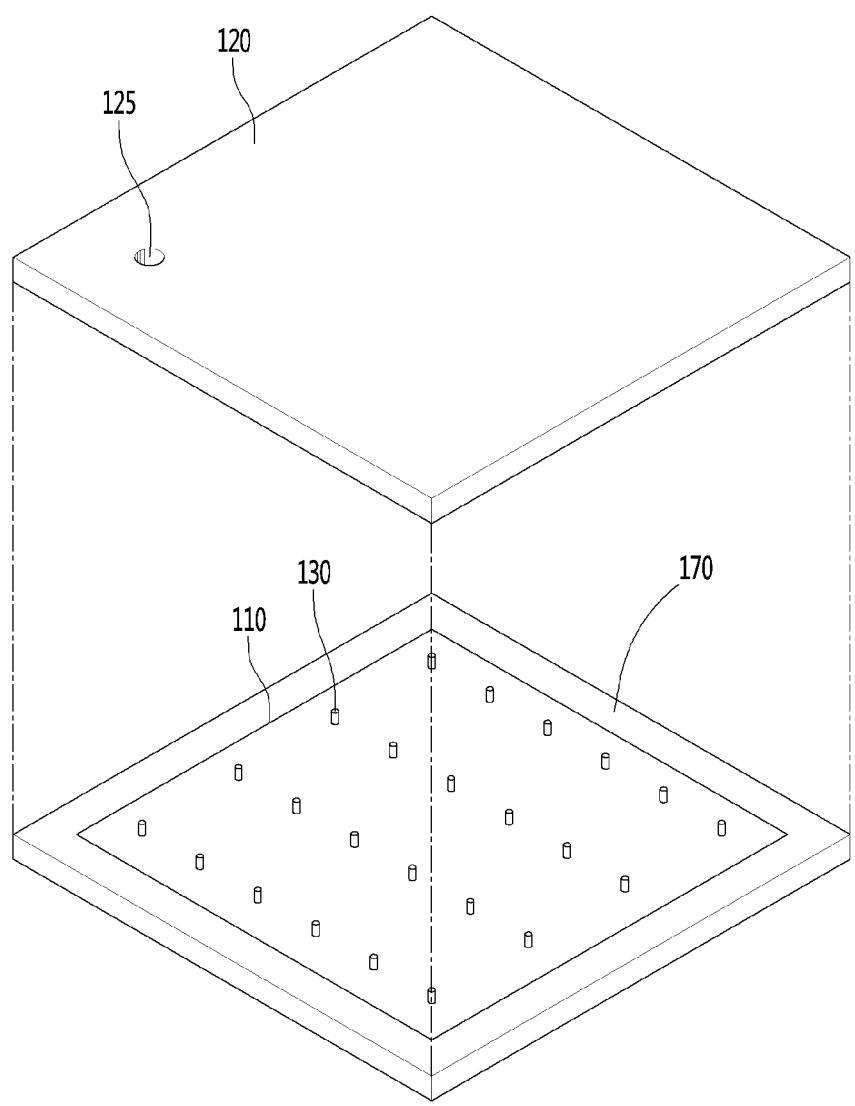

FIGS. 2A to 2C are views illustrating a manufacturing process of a plate glass assembly according to an embodiment of the present disclosure.

First, referring to FIG. 2A, the first plate glass 110 is provided. The first plate glass 110 may be provided while being cleaned.

The sealant 170 is applied to the first plate glass 110. The sealant 170 may be applied along an edge of the first plate glass 110. For example, the sealant 170 may be applied in a rectangular shape onto one surface of the first plate glass 110.

The spacer 130 may be provided on the top surface of the first plate glass 110. A plurality of spacers 130 may be provided at preset distances. For example, the plurality of spacers 130 may be arranged in a lattice (matrix) form. The plurality of spacers 130 may protrude from the top surface of the first plate glass 110 (see FIG. 2B).

The second plate glass 120 may be covered on the first plate glass 110. When the second plate glass 120 is provided, the upper portions of the plurality of spacers 130 may support the bottom surface of the second plate glass 120.

The exhaust hole 125 may be formed in the second plate glass 120. As described above, the exhaust hole 125 is understood as a component to exhaust gas present between the first and second plate glasses 110 and 120 to form the vacuum layer 180. In addition, the gas adsorbent 160 may be provided on the bottom surface of the second plate glass 120.

When the first and second plate glasses 110 and 120 are assembled in the above method, the assembly (hereinafter, a plate glass assembly) of the first and second plate glasses 110 and 120 is heated. In this procedure, the sealant 170 is melted and compressed to seal the edge portions of the first and second plate glasses 110 and 120 (see FIG. 2C).

Figure 3:
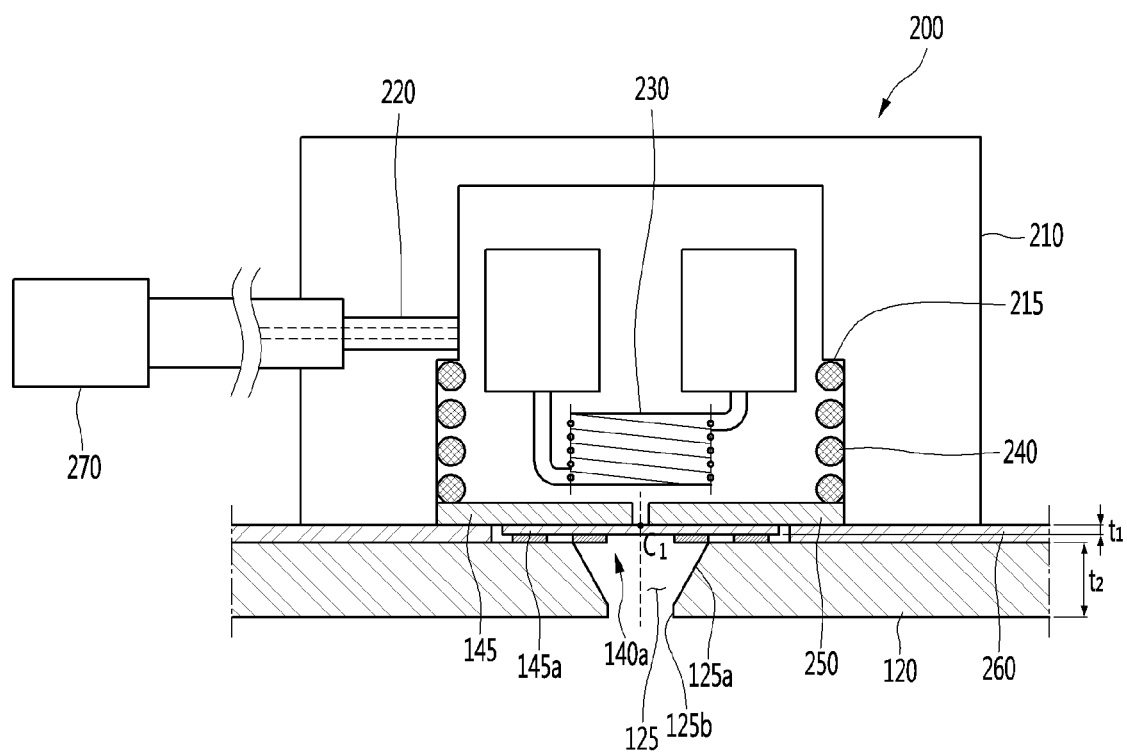
FIG. 3 is a view illustrating the configuration of an exhaust finishing device according to a first embodiment of the present disclosure.
Figure 4:
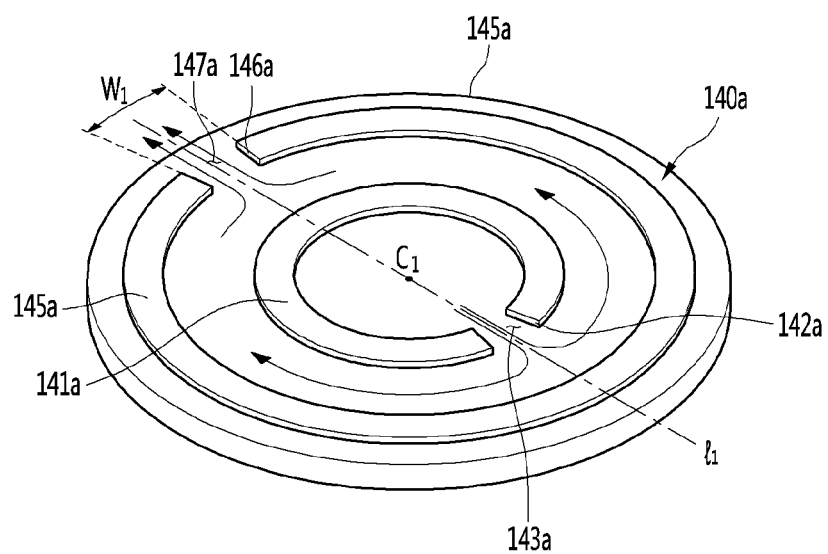
FIG. 4 is a view illustrating the configuration of an exhaust finishing frit and a cap frit according to the first embodiment of the present disclosure.
Figure 5:
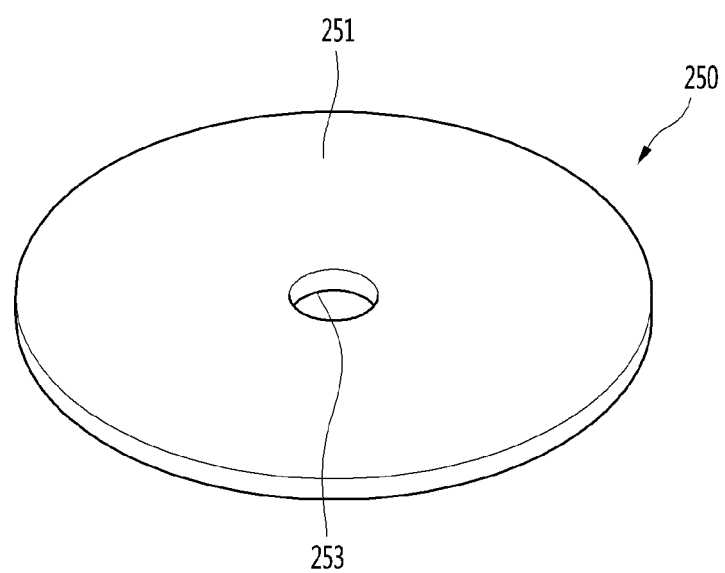
FIG. 5 is a view illustrating the configuration of a support plate according to a first embodiment of the present disclosure.

FIG. 3 is a view illustrating the configuration of an exhaust finishing device according to a first embodiment of the present disclosure. FIG. 4 is a view illustrating the configuration of an exhaust finishing frit and a cap frit, according to the first embodiment of the present disclosure. FIG. 5 is a view illustrating the configuration of the support plate according to the first embodiment of the present disclosure.

Referring to FIGS. 3 to 5, the plate glass assembly (110 and 120) assembled in the method described with reference to FIGS. 2A to 2C may be provided in an exhaust finishing device 200 to perform the exhaust process and the finish process.

The exhaust finishing device 200 includes an exhaust head 210 coupled to an exhaust pipe 220. A heating device 230 is provided in an inner space of the exhaust head 210 to heat and melt the exhaust finishing frit 140a. For example, the heating device 230 may include a heater. The inner space of the exhaust head 210 forms a flowing space for the exhaust gas when performing the exhaust process.

The plate glass assembly (110 and 120) is disposed under the exhaust head 210. In this case, the second plate glass 120 may be coupled to the lower portion of the exhaust head 210 such that the exhaust hole 125 is directed toward the lower portion of the exhaust head 210.

A vacuum pad 260 may be provided on the plate glass assembly (110 and 120) such that the plate glass assembly (110 and 120) makes close contact with the exhaust finishing device 200. For example, the vacuum pad 260 may be attached to the top surface of the plate glass assembly (110 and 120), that is, the second plate glass 120 and may make contact with the bottom surface of the exhaust head 210.

The vacuum pad 260 is interposed between the plate glass assembly (110 and 120) and the exhaust finishing device 200 to prevent gas from leaking out of the exhaust head 210 when the exhaust process is performed. For example, the vacuum pad 260 may include a graphite sheet or a metal member.

The cap frit 145a is mounted on the exhaust hole 125 of the plate glass assembly (110 and 120). The exhaust finishing frit 140a is provided on the bottom surface of the cap frit 145a. For example, the exhaust finishing frit 140a may protrude downward from the cap frit 145a.

The exhaust finishing frit 140a may be disposed to make contact with the top surface of the second plate glass 120. In addition, at least a portion of the exhaust finishing frit 140a may be disposed on the exhaust hole 125 or in the exhaust hole 125.

The exhaust finishing frit 140a includes a glass frit including a glass material. In detail, the exhaust finishing frit 140a is formed by preparing an enamel composition in the form of a paste. The exhaust finishing frit 140a in the form of the paste may be dispensed or applied in a specified shape to the cap frit 145a. For example, the exhaust finishing frit 140a may be supplied in a manner similar to squeezing toothpaste. Through such a manner, the exhaust finishing frit 140a may be aligned with respect to the exhaust finishing frit 140a.

In addition, a binder may be removed from the exhaust finishing frit 140a by performing a de-binding process with respect to the cap frit 145a including the exhaust finishing frit 140a. The de-binding process may be understood as a process of vaporizing the binder by exposing the cap frit 145a including the exhaust finishing frit 140a to an environment at a preset temperature.

The exhaust finishing frit in the paste form may be prepared by mixing glass powder including the enamel composition, a solvent, and a binder.

The enamel composition includes $P_2O_5$, $SiO_2$, $Al_2O_3$, $ZrO_2$ and $R_2O$. In the R2O, 'R' includes 'Li', 'Na', and 'K'.

In particular, the enamel including the enamel composition is a phosphate-based enamel containing $P_2O_5$. Since the phosphate-based enamel is a hydrophilic substance, the phosphate-based enamel may be easily bonded with water. As the content of $P_2O_5$ contained in the enamel is increased, the hydrophilic property of the enamel is increased. Therefore, the enamel-coated material may have increased contamination resistance.

In the enamel composition, $P_2O_5$, $SiO_2$, and $R_2O$ are basic components of the glass composition. In particular, $SiO_2$ is involved in forming glass. As the content of $SiO_2$ is increased, the glass may have higher acid resistance.

$Al_2O_3$ complements low chemical durability of an alkali phosphate glass structure through structural stabilization. In addition, $Al_2O_3$ is associated with higher heat resistance (transition temperature) and surface hardness.

$ZrO_2$ is significantly stable material as an inorganic material to increase the chemical resistance of the glass by uniformly melting the components constituting the glass. In addition, the $ZrO_2$ increases the specific resistance by interfering with the movement of alkali ions to improve the adhesion of the enamel in a dry process.

In addition, the enamel composition may further include $B_2O_3$, ZnO, $V_2O5$ or SnO.

$V_2O_5$ performs an action similar to the action of $Al_2O_3$, such as high heat resistance and surface hardness. SnO performs an action similar to an action of $ZrO_2$ by increasing the chemical resistance of glass.

$B_2O_3$ uniformly melts the components, and the thermal expansion coefficient of the glass is adjusted depending on the content of $B_2O_3$. The surface tension of the glass is controlled depending on the content of ZnO, thereby exerting an influence on a preparing characteristic of enamel, that is, coating.

The range of the weight % of the components constituting the composition is preferably as shown in following Table 1.

TABLE 1

| Ingredient | Weight % |
| --- | --- |
| $P_2O_5$ | 24.8 to 34.3 |
| $SiO_2$ | 10.8 to 22.2 |
| $Al_2O_3$ | 10.2 to 28.4 |
| $ZrO_2$ | 5.0 to 17.9 |
| $Na_2O$ | 9.0 to 20.8 |
| $K_2O$ | 5.0 to 15.2 |
| $Li_2O$ | 0.4 to 5.3 |
| $B_2O_3$ | 1.0 to 10.0 |
| ZnO | 0.3 to 10.0 |
| $V_2O_5$ | 0.9 to 10.0 |
| SnO | 0.5 to 5.0 |

The cap frit 145a is provided on the exhaust finishing frit 140a. The cap frit 145a may be interposed between the exhaust finishing frit 140a and the support plate 250. The cap frit 145a may be provided in the form of a thin circular plate. In addition, the cap frit 145a may include a glass frit, and may have a melting point higher than that of the exhaust finishing frit 140a.

When the exhaust process is performed, the exhaust pressure is transmitted to the exhaust finishing frit 140a through the cap frit 145a. In this process, the cap frit 145a strongly presses the exhaust finishing frit 140a including the glass frit.

According to such an action, when the following finish process is performed, air bubbles may be prevented from being generated in the process of melting the exhaust finishing frit 140a. Preferably, the air bubbles are prevented from being generated to block the cause of the leak of the vacuum layer 180 after the vacuum insulation glass 10 is completely manufactured.

The exhaust finishing device 200 further includes the support plate 250 provided at the lower portion of the exhaust head 210 to press the cap frit 145*a*. In other words, the support plate 250 may be disposed to make contact with the top surface of the cap frit 145*a*. In the process of performing the exhaust process, the support plate 250 presses down the cap frit 145*a*.

The support plate 250 prevents the thermal impact from being applied to the plate glass assembly (110 and 120) due to the temperature difference when the exhaust process and the finish process are performed. To this end, the support plate 250 may include metal material, for example, a stainless material. In addition, the support plate 250 may be interposed between the heating device 230 and the exhaust hole 125 of the plate glass assembly (110 and 120). The support plate 250 may be referred to as "heat radiation plate".

In detail, the exhaust process may be performed under the temperature environment of about 300° C. and the finish process may be performed under the temperature environment of about 400° C. In addition, the melting point of the exhaust finishing frit 140*a* may be greater than 300° C. and may be smaller than 400° C.

When the exhaust process and the finish process are performed, and when the temperature environment of each process is applied to the plate glass assembly (110 and 120) without change, the thermal impact is applied to the plate glass assembly (110 and 120) due to the temperature difference, thereby causing the damage to the plate glass assembly (110 and 120). Accordingly, the support plate 250 may be configured to cover upper portions of the exhaust finishing frit 140*a* and the cap frit 145*a*, the high-temperature heat is blocked by the support plate 250 to minimize the heat transfer to the plate glass assembly (110 and 120).

In addition, since the support plate 250 prevents heat transfer between the inner space of the exhaust head 210 and the plate glass assembly (110 and 120), the thermal impact is applied to the plate glass assembly (110 and 120) due to the temperature difference in the exhaust process and the finish process, thereby preventing the plate glass assembly (110 and 120) from being broken.

The support plate 250 includes a plate body 251 in a disc shape and a plate through part 253 formed through the plate body 251 to provide the flowing passage of the exhaust gas when the exhaust process is performed. The plate body 251 presses the cap frit 145*a* and may performs a function of preventing heat transfer from the exhaust head 210 to the plate glass assembly (110 and 120).

The plate through part 253 may be formed at the substantially central portion of the plate body 251. The plate through part 253 may communicate with the exhaust passes 143*a* and 147*a* of the exhaust finishing frit 140*a*.

In addition, the exhaust finishing device 200 further include an elastic member 240 provided in the inner space of the exhaust head 210 to apply elastic force to the support plate 250. For example, the elastic member 240 may include a coil compression spring.

The exhaust head 210 includes a spring support part 215 to support the elastic member 240. The spring support part 215 includes a support step provided on an inner surface of the exhaust head 210. The support step supports one portion of the elastic member 240. In addition, an opposite portion of the elastic member 240 may be supported on the top surface of the support plate 250. Since the elastic member 240 may press the support plate 250 down through the arrangement, the support plate 250 may press the cap frit 145*a* such that the position of the cap frit 145*a* may be stably fixed.

The elastic member 240 may be seated on an edge of the top surface of the support plate 250. For example, the diameter of the elastic member 240 may be formed to be equal to the diameter of the support plate 250. In addition, the heating device 230 may be provided in the elastic member 240 and may be spaced apart upward from the top surface of the support plate 250 by a specified distance.

The exhaust pipe 220 is disposed to be coupled to the exhaust head 210 while passing through the exhaust head 210, and an exhaust ump 270 may be operatively connected with an outer portion of the exhaust pipe 220. The exhaust pipe 220 may be coupled to the exhaust head 210 while passing through the side portion of the exhaust head 210.

Hereinafter, the configuration of the exhaust finishing frit 140*a* will be described with reference to FIG. 4.

The exhaust finishing frit 140*a* includes a first frit 141*a* having the shape of a circle cut off in a portion thereof and a second frit 145*a* spaced apart from the first frit 141*a* outward and having the shape of a circle cut off in a portion thereof. For example, the second frit 145*a* may be disposed to surround the first frit 141*a*. In addition, each of the first and second frits 141*a* and 145*a* may have the shape of an open loop.

The first frit 141*a* includes a first cutoff part 142*a* formed by cutting away at least a portion of the first frit 141*a*. Opposite end portions of the first frit 141*a* may be disposed to be spaced apart from each other through the configuration of the first cutoff part 142*a*. In addition, the space between the opposite end portions of the first frit 141*a* may form a first passage 143*a* through which exhaust gas flows.

The second frit 145*a* includes a second cutoff part 146*a* formed by cutting away at least a portion of the second frit 145*a*. Opposite end portions of the second frit 145*a* may be disposed to be spaced apart from each other through the configuration of the second cutoff part 146*a*. In addition, the space between opposite end portions of the second frit 145*a* may form a second passage 147*a* through which exhaust gas flows.

In the exhaust process, gas present inside the first and second plate glasses 110 and 120 may communicate with the plate through part 253 of the support plate 250 via the first passage 143*a* and the second passage 147*a* (see a solid line arrow mark).

The first passage 143*a* is positioned relatively close to the center C1 of the cap frit 145*a*, and the second passage 147*a* is positioned relatively far from the center C1 of the cap frit 145*a*. In other words, the distance from the center C1 of the cap frit 145*a* to the first passage 143*a* may be formed to be shorter than that from the center C1 of the cap frit 145*a* to the second passage 147*a*.

In addition, the first passage 143*a* and the second passage 147*a* may be positioned at opposite sides of the center C1 of the cap frit 145*a*.

In detail, when an extension line t1 is defined as passing through the center C1 of the cap frit 145*a* and the first passage 143*a* and the second passage 147*a*, the first passage 143*a* may be positioned at one side of the center 'C1' of the cap frit 145*a* and the second passage 147*a* may be positioned at an opposite side of the center C1 of the cap frit 145*a*. In other words, the first and second passages 143*a* and 147*a* may be disposed to face each other based on the center 'C1' of the cap frit 145*a*.

The thickness t1 of the cap frit 145a in the vertical direction may be determined to be a predetermined value or more such that the vacuum pressure having a desired level or more is applied. For example, it is necessary to form the thickness t1 of the cap frit 145a in the vertical direction to at least 1 mm or more. In this case, the desired vacuum tightness of a plate glass assembly may be performed.

The thickness t1 of the cap frit 145a in the vertical direction may be determined to be less than ½ of the thickness t2 of the second plate glass 120 in the vertical direction. When the thickness t1 of the cap frit 145a in the vertical direction is formed to be equal to or greater than ½ of the thickness t2 of the second plate glass 120 in the vertical direction, the exhaust finishing frit 140a, which is in the plastic state and significantly pressurized by the cap frit 145a, is widely spread out of the cap frit 145a in the finish process, so the significant portion of the exhaust finishing frit 140a is exposed to the outside. In addition, the vacuum leak may occur through the exposed portion. Accordingly, the thickness t1 of the cap frit 145a in the vertical direction may be limited.

The minimum width w1 of the first passage 143a and the second passage 147a may be determined in an appropriate range based on the easiness of the exhaust of the gas and the finish process. For example, the width 'w1' may be determined in the range of 1 mm to 2 mm. When the width 'w1' is less than 1 mm, it is difficult to easily exhaust gas. When the width 'w1' is equal to or greater than 2 mm, the exhaust finishing frit 140a may not sufficiently seal the exhaust hole 125.

Figure 6:
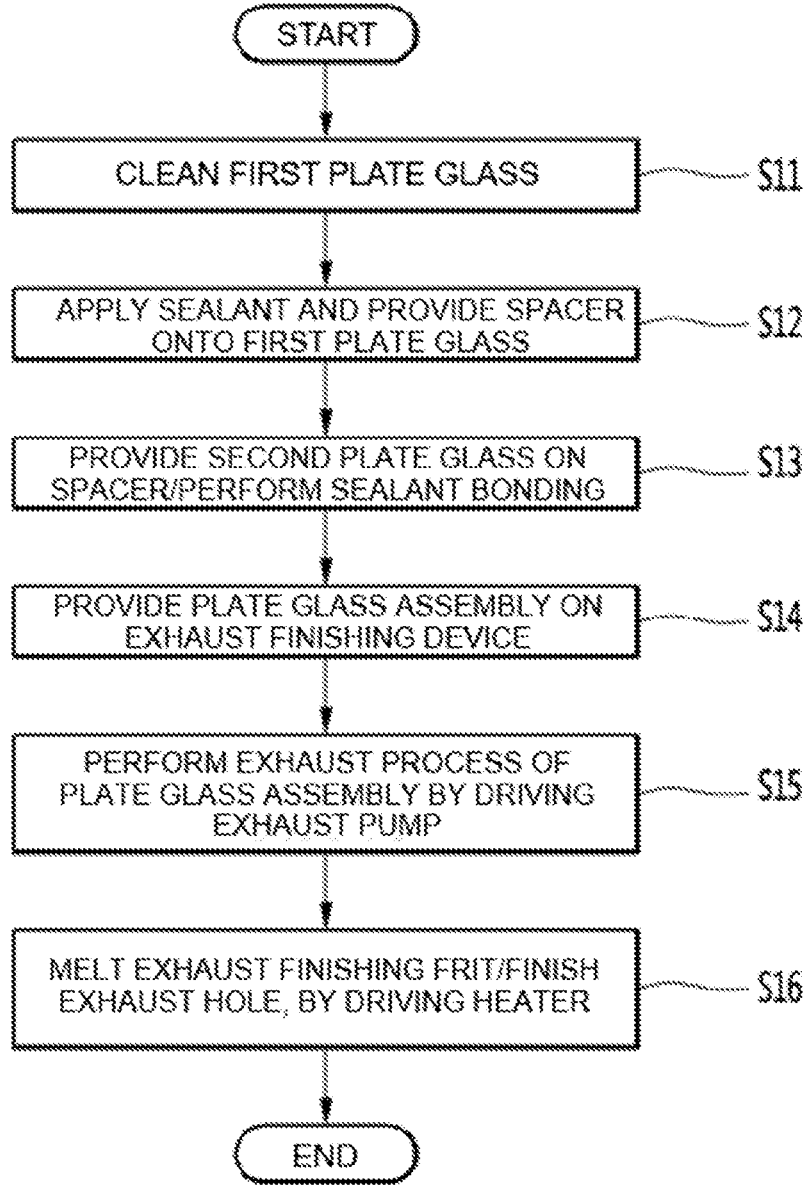
FIG. 6 is a flowchart illustrating a method for manufacturing vacuum insulation glass according to the first embodiment of the present disclosure.
Figure 7:
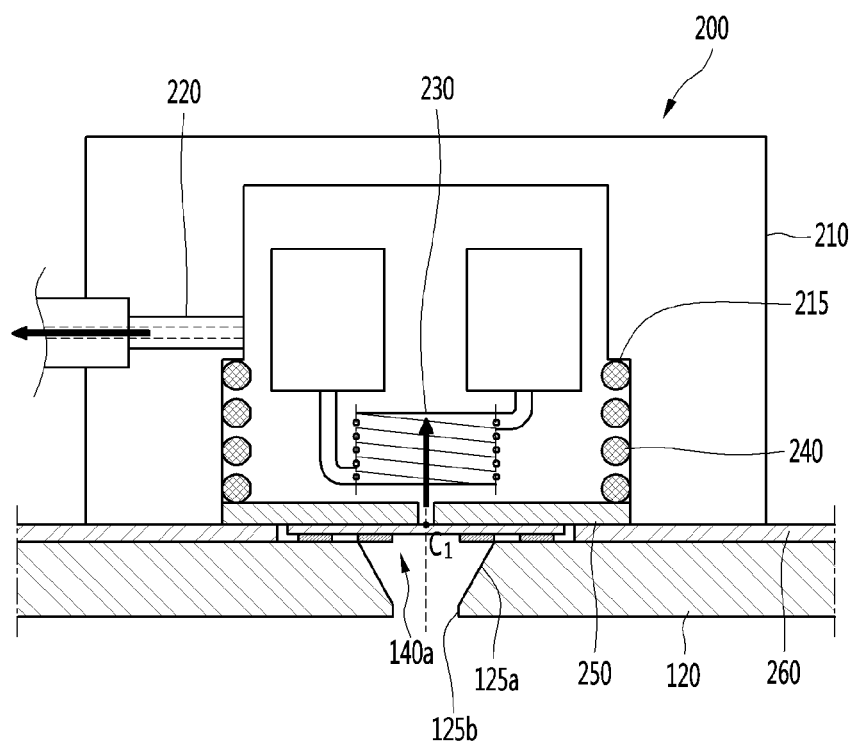
FIG. 7 is a view illustrating that an exhaust process is performed in an exhaust finishing device according to the first embodiment of the present disclosure.
Figure 8:
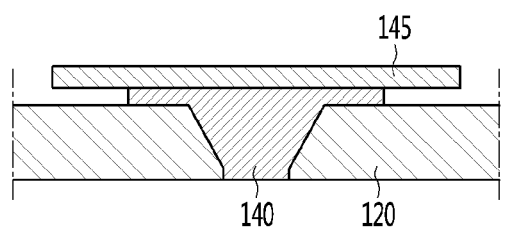
FIG. 8 is a sectional view that an exhaust finishing material is sealed on plate glass after performing an exhaust process and a finish process of vacuum insulation glass according to the first embodiment of the present disclosure.

FIG. 6 is a flowchart illustrating a method for manufacturing vacuum insulation glass according to the first embodiment of the present disclosure, FIG. 7 is a view illustrating that an exhaust process is performed in the exhaust finishing device according to the first embodiment of the present disclosure, and FIG. 8 is a sectional view that an exhaust finishing material is sealed on plate glass after performing the exhaust and finish process of the vacuum glass according to the first embodiment of the present disclosure.

First, referring to FIG. 6, the first plate glass 110 is provided. The first plate glass 110 may be provided while being cleaned (S11).

The sealant 170 is applied to the first plate glass 110. The sealant 170 may be applied along an edge of the first plate glass 110. The spacer 130 may be provided on the top surface of the first plate glass 110. A plurality of spacers 130 may be provided at preset distances. The plurality of spacers 130 may protrude from the top surface of the first plate glass 110 (S12).

The second plate glass 120 may be covered on the first plate glass 110. When the second plate glass 120 is provided, the upper portions of the plurality of spacers 130 may support the bottom surface of the second plate glass 120.

The exhaust hole 125 may be formed in the second plate glass 120. As described above, the exhaust hole 125 is understood as a component to exhaust gas present between the first and second plate glasses 110 and 120 to form the vacuum layer 180. In addition, the gas adsorbent 160 may be provided on the bottom surface of the second plate glass 120.

When the first and second plate glasses 110 and 120 are assembled in the method, the assembly (hereinafter, a plate glass assembly) of the first and second plate glasses 110 and 120 is heated. In this heating procedure, the sealant 170 is melted and compressed to seal the edge of the first and second plate glasses 110 and 120 (S13).

The plate glass assembly (110 and 120) is provided in the exhaust finishing device 200. In detail, the vacuum pad 260 may be coupled to the top surface of the plate glass assembly (110 and 120), and the bottom surface of the exhaust head 210 may make close contact with the top surface of the vacuum pad 260.

The support plate 250 is provided at the lower portion of the exhaust head 210 and the elastic member 240 is coupled to the upper portion of the support plate 250. The cap frit 145a having the exhaust finishing frit 140a is seated on the exhaust hole 125 of the plate glass assembly (110 and 120). In addition, the support plate 250 may be disposed to press the top surface of the cap frit 145a (S14).

The exhaust pump 270 is connected to the exhaust pipe 220 coupled to the exhaust head 210. The temperature of the inner space of the exhaust head 210 may be increased to the temperature (about 300° C.) for performing the exhaust process. For example, the increase in the temperature may be performed through the operation of the heating device 230 or another heating device (heating furnace).

Gas present inside the plate glass assembly (110 and 120) is exhausted by driving the exhaust pump 270, that is, the exhaust process is performed.

In detail, referring to FIGS. 7 and 8, when the exhaust process is performed, the gas present inside the plate glass assembly (110 and 120) may flow up toward the center C1 of the cap frit 145a and may be exhausted to the outside of the exhaust finishing frit 140a via the first passage 143a and the second passage 147a of the exhaust finishing frit 140a.

In addition, the exhausted gas may flow into the inner space of the exhaust head 210 through the plate through part 253 of the support plate 250 and may be discharged to the exhaust pump 270 via the exhaust pipe 220 (S15).

After the exhaust process is completed, the finish process is performed by driving the heating device 230. In detail, the exhaust finishing frit 140a is melted by driving the heating device 230. When the heating device 230 is driven, the exhaust finishing frit 140a may be applied with heat having the temperature of about 400° C. higher than the melting point of the exhaust finishing frit 140a. In addition, since the melting point of the cap frit 145a is formed to be greater than 400° C., the cap frit 145a may not be melted.

When the exhaust finishing frit 140a is melted, the melted exhaust finishing frit 140a constitutes the exhaust finishing material 140 to block the exhaust hole 125 and to seal the exhaust hole 125 after cooling. In this procedure, the cap frit 145a constitutes the exhaust cap 145 coupled to the exhaust finishing material 140 to cover the upper portion of the exhaust finishing frit 140a. The exhaust cap 145 may make close contact with the plate glass assembly (110 and 120) through the exhaust finishing material 140 (see FIG. 8).

After the finish process, the additional cover member may be coupled to the upper portion of the cap frit 145a, and the coupled cover member may constitute the finish cap 147 (S16).

According to such a manufacturing method, the exhaust process and the finish process of the plate glass assembly (110 and 120) may be realized with reality through a simple process.

Hereinafter, the second to fourth embodiments of the present disclosure will be described. The description of the embodiments will be made while focusing on the difference in some components of the exhaust finishing frit since there is made the difference in the some components of the exhaust finishing frit when comparing the embodiments with the first embodiment. In addition, regarding the same component as components of the first embodiment, the description and the reference numerals of the first embodiment will be cited.

Figure 9:
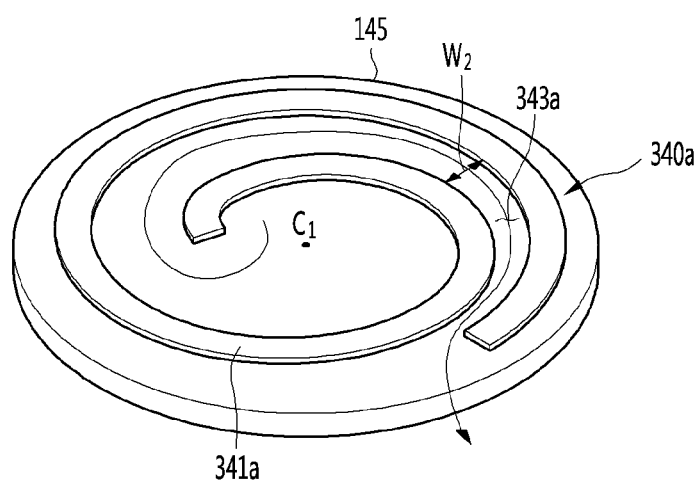
FIG. 9 is a view illustrating the configuration of an exhaust finishing frit and a cap frit according to a second embodiment of the present disclosure.

FIG. 9 is a view illustrating the configuration of an exhaust finishing frit and a cap frit according to a second embodiment of the present disclosure.

Referring to FIG. 9, according to the second embodiment of the present disclosure, an exhaust finishing frit 340a includes a frit body 341a forming an open loop. In detail, the frit body 341a may extend in the spiral shape. Due to the characteristic of the spiral shape, a portion and another portion constituting the frit body 341a may be spaced apart from each other. In addition, the space may have an exhaust passage 343a to exhaust gas.

An inner space and an outer space of the frit body 341a may be configured to communicate with each other through the exhaust passage 343a.

The exhaust passage 343a is provided to have the spiral shape toward the outer circumferential surface of the cap frit 145a from the center 'C1' of the cap frit 145a, and the gas present inside the plate glass assembly (110 and 120) may flow into the plate through part 253 of the support plate 250 (see a solid line arrow mark).

The minimum width 'w2' of the exhaust passage 343a may be determined to be in the appropriate range based on the exhaust of the gas and the easiness of the finish process. For example, the width 'w2' is determined to be in the range of 1-2 mm, and the reason for the range has been described in the first embodiment.

Figure 10:
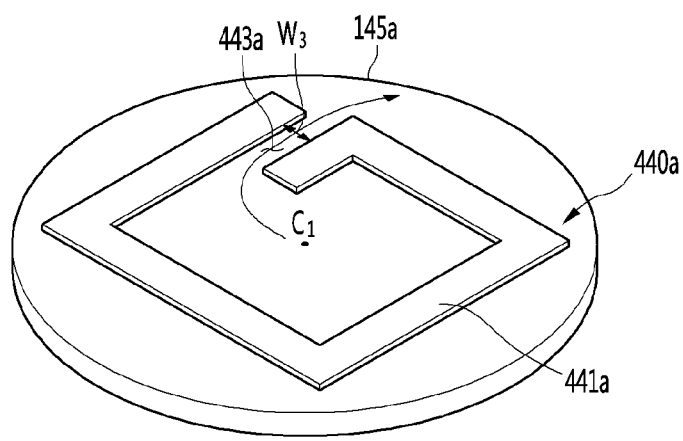
FIG. 10 is a view illustrating the configuration of an exhaust finishing frit and a cap frit according to a third embodiment of the present disclosure.

FIG. 10 is a view illustrating the configuration of the exhaust finishing frit and the cap frit, according to the third embodiment of the present disclosure.

Referring to FIG. 10, according to the third embodiment of the present disclosure, an exhaust finishing frit 440a includes a frit body 441a forming an open loop. In detail, the frit body 441a may have the shape bent several times. Opposite end surfaces of the frit body 441a may face opposite directions to each other.

A portion and another portion constituting the frit body 441a may be spaced apart from each other. In addition, the space may have an exhaust passage 443a to exhaust gas. An inner space and an outer space of the frit body 441a may be configured to communicate with each other through the exhaust passage 443a.

The exhaust passage 443a is provided to extend toward the outer circumferential surface of the cap frit 145a from the center 'C1' of the cap frit 145a, and the gas present inside the plate glass assembly (110 and 120) may flow into the plate through part 253 of the support plate 250 (see a solid line arrow mark) through the exhaust passage 443a.

The minimum width 'w3' of the exhaust passage 443a may be determined to be in the appropriate range based on the exhaust of the gas and the easiness of the finish process. For example, the width 'w3' is determined to be in the range of 1-2 mm, and the reason for the range has been described in the first embodiment.

Figure 11:
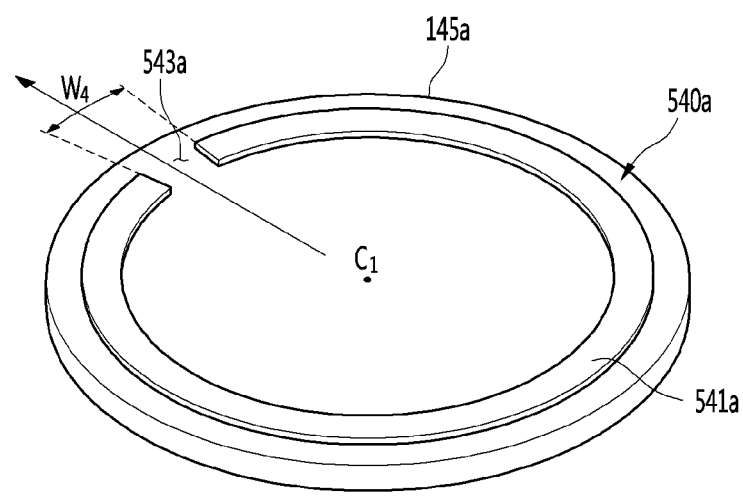
FIG. 11 is a sectional view illustrating that an exhaust finishing frit is mounted on second plate glass according to a fourth embodiment of the present disclosure.

FIG. 11 is a sectional view illustrating that an exhaust finishing frit is mounted on second plate glass according to a fourth embodiment of the present disclosure.

Referring to FIG. 11, according to the fourth embodiment of the present disclosure, an exhaust finishing frit 540a includes a frit body 541a forming an open loop. In detail, the frit body 541a may have the shape of a circle cut off in at least a portion thereof.

A cutoff part 544a is formed in the frit body 541a. Opposite end portions of the first frit 541a may be disposed to be spaced apart from each other through the configuration of the first cutoff part 544a. In addition, the space between opposite end portions of the frit body 541a may form a first passage 543a in which exhaust gas flows. The gas present inside the plate glass assembly (110 and 120) may flow into the plate through part 253 of the support plate 250 through the exhaust passage 543a (see solid line arrow mark).

The minimum width 'w4' of the exhaust passage 543a may be determined to be in the appropriate range based on the exhaust of the gas and the easiness of the finish process. For example, the width 'w4' is determined to be in the range of 1-2 mm, and the reason for the range has been described in the first embodiment.

According to an embodiment of the present disclosure, in the method for manufacturing the vacuum glass, since the vacuum insulation glass having the improved insulating performance is manufactured, there may be remarkable industrial applicability.

What is claimed is:

1. An apparatus for manufacturing vacuum insulation glass, the apparatus comprising:
    an exhaust head disposed at a side of a glass assembly having an exhaust hole;
    an exhaust pump fluidly connected to the exhaust head to exhaust an internal gas of the glass assembly to form a vacuum;
    a cap frit disposed on the exhaust hole of the glass assembly;
    an exhaust finishing frit provided at a bottom surface of the cap frit and including a frit formed of a glass material, the exhaust finishing frit including an exhaust passage through which the internal gas of the glass assembly is exhausted; and
    a support plate provided under the exhaust head to press against the cap frit, the support plate being provided at a top of the cap frit,
    wherein the support plate has a circular plate shape and includes a plate through part to communicate with the exhaust passage of the exhaust finishing frit, the plate through part being formed at a center of the circular plate shape and aligned in a center of the cap frit.

2. The apparatus of claim 1, wherein the exhaust finishing frit includes a first frit having a first open loop shape defined by a first cutoff part and a second frit having a second open loop shape defined by a second cutoff part, the first cutoff part and the second cutoff part defining the exhaust passage, and
    wherein the second frit surrounds the first frit such that the first frit is provided inside the second frit.

3. The apparatus of claim 2, wherein each of the first frit and the second frit includes a round shape or a bent shape.

4. The apparatus of claim 2, wherein the exhaust passage includes:
    a first passage defined by the first cutoff part; and
    a second passage defined by the second cutoff part, the second passage forming a downstream flow path of the first passage.

5. The apparatus of claim 2, wherein a distance from a center of the cap frit to the first cutoff part is shorter than a distance from the center of the cap frit to the second cutoff part.

6. The apparatus of claim 2, wherein the first cutoff part and the second cutoff part are positioned at opposed sides with respect to the center of the cap frit such that the internal gas passing through the first cutoff part flows through the second cutoff part.

7. The apparatus of claim 2, wherein each of the first and second frits includes a cylindrical shape, wherein the first and second cutoff parts are formed in at least a portion of the cylindrical shape.

8. The apparatus of claim 1, wherein the exhaust finishing frit includes a paste-type enamel composition, and
the exhaust finishing frit is dispensed in a predetermined shape at the cap frit.

9. The apparatus of claim 8, wherein the exhaust finishing frit including the paste-type enamel composition is formed by mixing glass powder including the enamel composition, a solvent, and a binder.

10. The apparatus of claim 8, wherein the enamel composition includes $P_2O_5$, $SiO_2$, $Al_2O_3$, $ZrO_2$, and $R_2O$,
wherein R includes Li, Na, and K.

11. The apparatus of claim 10, wherein the enamel composition includes at least one of $B_2O_3$, ZnO, $V_2O_5$, and SnO.

12. The apparatus of claim 11, wherein a weight % of components constituting the enamel composition includes:

| component | weight % |
|---|---|
| $P_2O_5$ | 24.8 to 34.3 |
| $SiO_2$ | 10.8 to 22.2 |
| $Al_2O_3$ | 10.2 to 28.4 |
| $ZrO_2$ | 5.0 to 17.9 |
| $Na_2O$ | 9.0 to 20.8 |
| $K_2O$ | 5.0 to 15.2 |
| $Li_2O$ | 0.4 to 5.3 |
| $B_2O_3$ | 1.0 to 10.0 |
| ZnO | 0.3 to 10.0 |
| $V_2O_5$ | 0.9 to 10.0 |
| SnO | 0.5 to 5.0 |

13. The apparatus of claim 1, wherein a melting point of the cap frit is higher than a melting point of the exhaust finishing frit.

14. The apparatus of claim 1, further comprising:
a heating device disposed above the support plate to heat the cap frit and the exhaust finishing frit,
wherein the heating device heats the cap frit and the exhaust finishing frit through the support plate.

15. The apparatus of claim 14, wherein the heating device heats the cap frit and the exhaust finishing frit at a first temperature when an exhaust process is performed in which the internal gas of the glass assembly is exhausted by driving the exhaust pump, and
the heating device heats the cap frit and the exhaust finishing frit at a second temperature higher than the first temperature when a finish process is performed in which the exhaust finishing frit is melted to seal the exhaust hole.

16. The apparatus of claim 1, wherein the exhaust finishing frit extends in a spiral shape toward an outer circumferential surface of the cap frit from a center of the cap frit and includes a first portion to be round and a second portion to be round and being an adjacent portion of the first portion, and
wherein a space between the first portion and the second portion defines the exhaust passage such that the exhaust passage has a spiral shape.

* * * * *